United States Patent [19]

Tilman

[11] Patent Number: 4,581,269
[45] Date of Patent: Apr. 8, 1986

[54] MEANS FOR ANCHORING CARPETING OR THE LIKE, AND A METHOD OF AND APPARATUS FOR MAKING THE SAME

[75] Inventor: Paul A. Tilman, New York City, N.Y.

[73] Assignee: Minigrip, Inc., Orangeburg, N.Y.

[21] Appl. No.: 612,849

[22] Filed: May 22, 1984

[51] Int. Cl.<sup>4</sup> .............................................. B32B 3/06
[52] U.S. Cl. ........................................ 428/62; 16/4; 16/16; 24/587; 24/DIG. 11; 156/66; 156/244.11; 156/304.4; 156/304.5; 156/499; 156/500; 428/100
[58] Field of Search ......... 16/4, 16; 24/587, DIG. 11; 156/66, 244.11, 304.4, 304.5, 500, 499; 428/17, 62, 100; 160/327

[56] References Cited

U.S. PATENT DOCUMENTS

| | | | |
|---|---|---|---|
| 2,552,114 | 5/1951 | Reinhard | 16/16 X |
| 3,373,464 | 3/1968 | Ausnit | 24/201 |
| 4,416,713 | 11/1983 | Brooks | 156/304.4 X |
| 4,419,159 | 12/1983 | Herrington | 156/66 |

Primary Examiner—Robert A. Dawson
Attorney, Agent, or Firm—Hill, Van Santen, Steadman & Simpson

[57] ABSTRACT

For anchoring carpeting such as of the artificial turf type, or the like, to other such carpeting or to an anchoring device, scrim carrying separable fastener means in the form of an extruded strip having an attachment flange along one edge engaged with one face of a margin of the scrim and resiliently flexible rib and groove fastener profile structure extending longitudinally along an opposite edge of the strip and adapted to be interlocked with complementary fastener profile structure. A bonding ribbon is engaged with the opposite face of the scrim margin and is bonded to the attachment flange through openings in the scrim margin. A method of making the carpet anchoring assembly is adapted to be practiced in apparatus which provides for extrusion of both the fastener strip and the bonding ribbon toward the scrim margin and effecting thermoplastic bonding between pressure rolls as the scrim moves along a continuous fabrication path.

20 Claims, 6 Drawing Figures

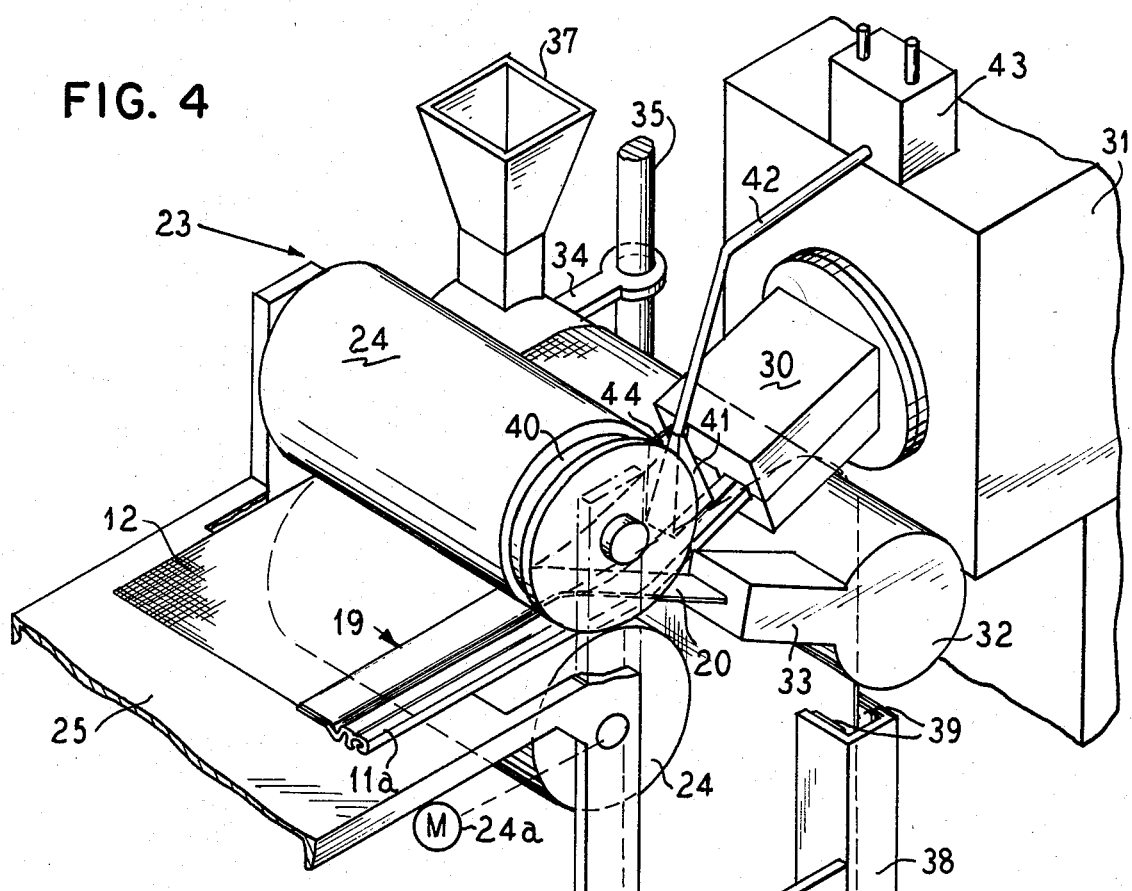
FIG. 4
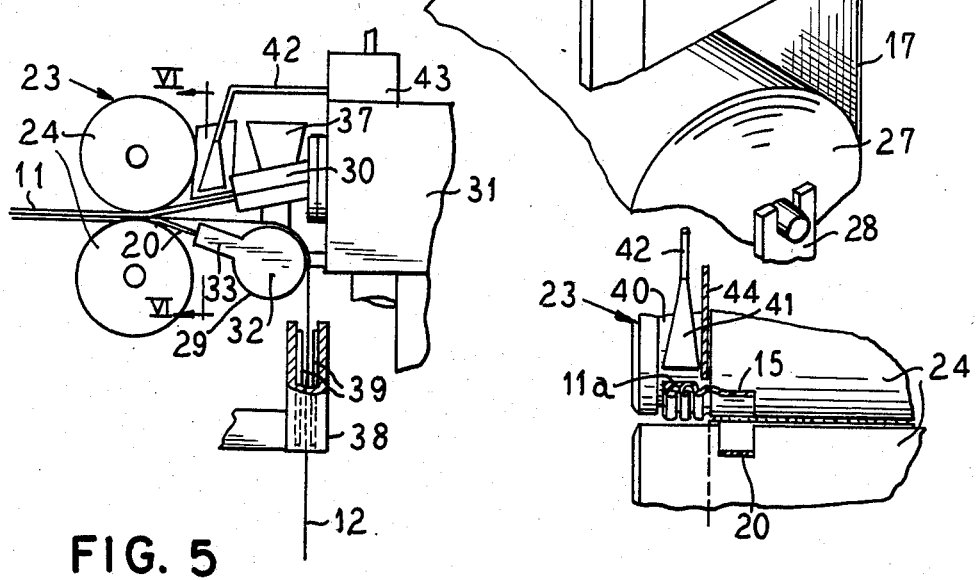
FIG. 5
FIG. 6

MEANS FOR ANCHORING CARPETING OR THE LIKE, AND A METHOD OF AND APPARATUS FOR MAKING THE SAME

This invention relates to improvements in means for anchoring carpeting, or the like, to other carpeting or to an anchoring device, and is more particularly concerned with anchoring carpeting or other covers or materials having a backing scrim or a backing to which scrim is conveniently attachable.

One popular form of carpeting which is extensively used as artificial turf has heretofore commonly had the several sheets required to cover a playing field or other area anchored together by means of toothed zippers. Where, as is generally the case, the artificial turf carpeting is laid directly on foam or a concrete surface. If any of the teeth become damaged, replacement is generally impractical, and this may require removal and replacement of the whole length of zipper which may be as long as 200 feet. Further, the interlocking toothed zippers require rather costly fabric stringers by which the zippers are sewed onto the backing of the artificial turf or carpeting, such backing generally comprising a scrim.

A superior type of separable fastener for the indicated purpose comprises an extruded interlocking rib and groove fastener structure such as exemplified in U.S. Pat. No. 3,373,464. Such a fastener is adapted to be extruded from a suitable thermoplastic material which will meet weather requirements, is adequately resiliently flexible for the intended purpose, and is adapted to be impervious to most chemical attacks to which the carpeting covers or other materials may be subjected. However, certain shortcomings have been encountered, in that where an ideal "thermoplastic" material for the purpose has been proposed, separable rib and groove fastener strips made therefrom do not lend themselves readily to being sewed in place. The nature of the material, is such that in extruded section it affords excellent tensile strength when unpunctured, but it looses strength if punctured by sewing. Although the plastic material of the extruded fastener may be fused to a plastic sheet as exemplified in the aforesaid U.S. Patent, the ideal material may not lend itself satisfactorily to fused bonding or even adhesive bonding to a backing material of the artificial turf, at least at a commercial bonding rate.

A principal object of the present invention, therefore, is to provide a new and improved means for anchoring carpeting or covers or the like to other carpeting or covers or to an anchoring device, and provided with extruded plastic rib and groove resiliently flexible fastener profile separable fastener means, and a method of and apparatus for making the same, and which will overcome the problems and deficiencies of the expedients heretofore available.

Another object of this invention is to incorporate scrim into or with an extruded fastener (zipper, closure strip) to enable securing the fastener to covering or sheeting with which the fastener is incompatible for bonding by customary commercial expedients.

In accordance with the principles of the present invention there is provided means for anchoring large sheet material sections such as of the artificial turf type, or covers or the like, to other such sections or to an anchoring device, and comprising scrim carrying separable fastener means, the fastener means comprising an extruded strip having an attachment flange along one edge and which flange is engaged with one face of a margin of the scrim, and having resiliently flexible rib and groove fastener profile structure extending longitudinally along an opposite edge of the strip and adapted to be interlocked with complementary fastener profile structure, thermoplastic bonding means engaged with an opposite face of the scrim margin and sandwiching the scrim margin between the attachment flange and the bonding means, and the bonding means being bonded to the attachment flange through openings in the scrim margin and thereby assuring securement of the fastener means to the scrim.

The invention also provides a method of making a means for anchoring large material sections such as of the artificial turf type, or the like, to other such carpeting or covers or the like, to other such sections or to an anchoring device, and comprising providing an extruded fastener means strip having along one edge an attachment flange and along an opposite edge a longitudinally extending rib and groove resiliently flexible fastener profile structure, sandwiching a scrim margin between the attachment flange and a thermoplastic bonding means, and thermoplastically bonding the bonding means to the attachment flange through openings in the scrim margin and thereby the fastener means to the scrim.

There is also provided by the present invention apparatus for making means for anchoring large material sections such as of the artificial turf type, or covers or the like, to other such sections or to an anchoring device, and comprising means for feeding scrim as a continuous strip along a fabrication path, means for directing toward a margin of the scrim in movement along the path an extruded fastener strip provided with an attachment flange along one edge and longitudinally extending fastener rib and groove profile means along an opposite edge, the attachment flange being joined in face-to-face engagement with one face of a margin of the scrim as the scrim moves along the fabrication path, means for directing a thermoplastic bonding means toward and into engagement with the opposite face of the scrim margin and in the direction of movement of the scrim and the fastener strip in the fabrication path, and means for effecting bonding of the bonding means to the scrim margin through openings in the scrim margin and thereby securing the scrim margin in sandwiched relation between the attachment flange and the bonding means.

Other objects, features and advantages of the present invention will be readily apparent from the following description of certain representative embodiments thereof, taken in conjunction with the accompanying drawings, although variations and modifications may be effected without departing from the spirit and scope of the novel concepts embodied in the disclosure, and in which:

FIG. 4 is a more or less schematic isometric view showing apparatus for making the means for anchoring carpets or the like in accordance with the present invention;

FIG. 5 is a reduced scale side elevational view of the apparatus of FIG. 4; and

FIG. 6 is a fragmentary sectional elevational detail view taken substantially along the line VI—VI in FIG. 5.

Figure 1:
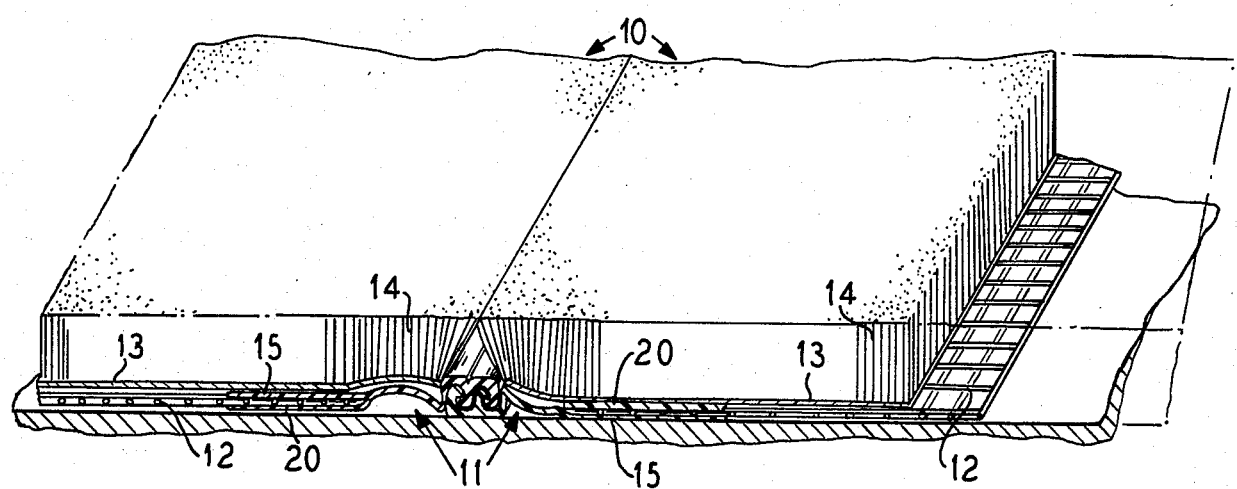
FIG. 1 is a fragmentary isometric view of two pieces of carpeting or cover, which may be of the artificial turf type, fastened together by fastener means, in accordance with the principles of the present invention.

Referring to FIG. 1, pieces of carpeting 10 are shown as separably attached together in edge-to-edge relation by means of extruded separable fasteners 11 secured to scrim 12 which may be attached to or form part of backing 13 of the carpeting 10. In this instance, the carpeting 10 may be of the artificial turf type having short tough grass simulating nap bristles 14 firmly attached to the backing 13.

In a preferred construction, the fasteners 11 consist of an extruded strip of a material which may be referred to as thermoplastic rubber or other thermoplastic or thermosetting polymers adapted to be extruded in the desired section modulus and which will have the desired characteristics of tensile strength, resilient flexibility, weather resistance, chemical resistance, color characteristics, and the like, suitable for the purpose. Commercial formulations of the plastic material are readily available. Each of the fastener strips 11 is adapted to be completely interchangeable with the other fastener strip so that if desired both fastener strips may be derived from a common extrusion die.

Figure 3:
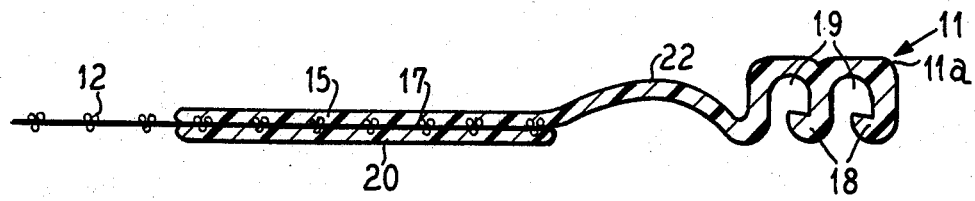
FIG. 3 is an enlarged fragmentary sectional detail view taken substantially along the line III—III in FIG. 2.

Each fastener strip 11 has an attachment flange 15 along one edge (FIGS. 1 and 3) which is engaged with one face of a margin 17 of the scrim 12. Along an opposite edge of the fastener strip is a marginal track portion 11a providing rib and groove resiliently flexible, separably interlockable fastener profile structures, comprising a plurality, herein two, of longitudinally extending hook-shaped ribs 18 and complementary rib-receiving grooves 19. The ribs 18 of one fastener strip 11 are adapted to be engaged interlockingly within the grooves 19 of the companion fastener strip 11 by pressing the portions 11a together. On the other hand, if necessary, the rib and groove fastener profiles may be separably interlocked with anchoring devices such as those described in the aforesaid U.S. Pat. No. 3,373,464, as for example at the outer ends of an artificial turf covering or sheeting overlying a playing field, and which covering or turf may comprise a number of carpet pieces attached together in edge-to-edge relation by means of the fasteners 11.

Figure 2:
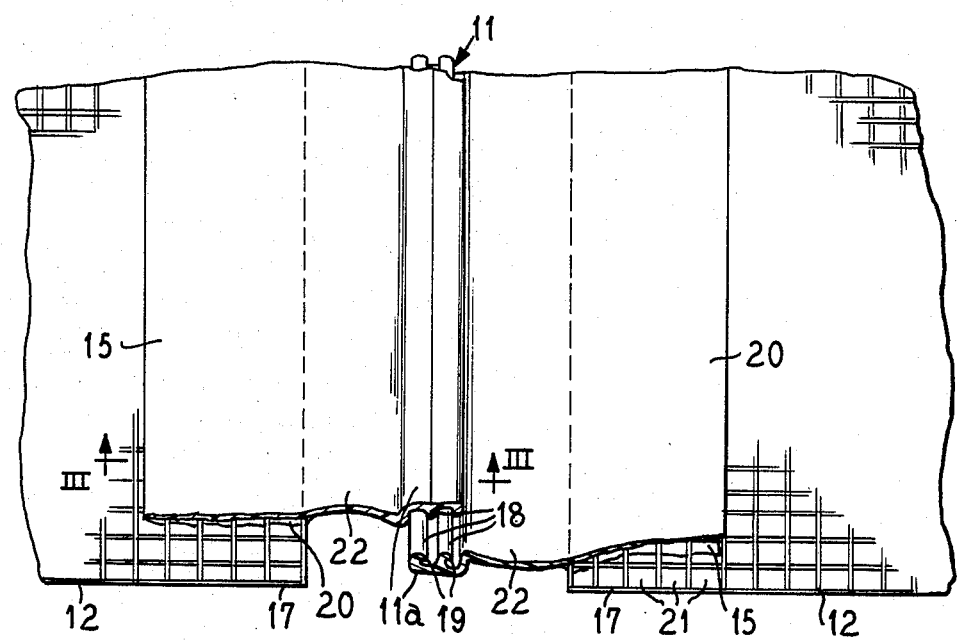
FIG. 2 is a fragmentary top plan view of the anchoring means of FIG. 2, omitting the carpeting or cover.

For securing the scrim 12 to the fasteners 11, thermoplastic bonding means 20 sandwiches the scrim margin 17 in each instance between the attachment flange 15 and the bonding means 20, and is bonded to the attachment flange 15 through openings 21 in the scrim margin (FIG. 2). Where the scrim 12 is of the fairly open mesh type shown, the openings 21 are in ample array throughout the scrim margin 17. If the scrim is of a weave that is too close to afford ample openings for the present purposes, the margin 17 may be formed with a suitable array of openings by means of punching, or the like. Desirably a resilient web 22 is provided between the profiled fastener portion 11a and the margin 15 whereby to facilitate flexible manipulation of the fastener portions 11a for securing the fasteners together or peeling them apart or otherwise separating them.

High speed continuous manufacture of the fastener-carrying scrim assembly is adapted to be practiced, for example, by means of apparatus 23 (FIGS. 4–6). To this end, the apparatus 23 comprises means including scrim-driving pinch feed rolls 24 adapted to be driven by means such as a motor 24a and associated with a receiving table 25 located along a fabrication path. The scrim 12 may be fed from a supply roll 27 conveniently supported by means 28 for travel upwardly over a guide member 29 by which the scrim strip is directed through preferably a free span in a plane with and toward the nip of the rolls 24. Means comprising an extrusion nozzle 30 is provided for the extruding the fastener strip 19 and directing it toward the margin 17 of the scrim 12 as the scrim moves along its fabrication path. More particularly, the nozzle 30, associated with an extruder 31, is located above the free span of the scrim between the guide 29 and the drive rollers 24 for directing the extruded fastener strip 19 toward the scrim margin 17 at substantially the inrunning side of the nip of the rolls 24. There the attachment flange 15 of the fastener strip is joined in face-to-face engagement with one face, herein the upper face, of the margin 17 of the scrim 12.

Means for directing the thermoplastic bonding means 20 in the form of a ribbon comprises an extruder 32 from which the strip 20 is extruded and which in this instance also provides the guide 29, and has an extrusion nozzle 33 located below the free span of the scrim 12 and arranged to direct the extruded bonding ribbon 20 toward the scrim margin 17 at the inrunning side of the nip of the rolls 24 and against the side of the scrim margin 17 opposite to that on which the fastener strip 11 is applied to the scrim margin. Support for the extruder 32 may be by means of a bracket 34 mounted on a post 35. Suitable means such as a hopper 37 may be provided for supplying the extruder 32 with plastic feedstock. Any suitable means such as is common in the extrusion art may be provided for supplying the extruder 31 with plastic feedstock.

As the extruded fastener strip 11 and the extruded bonding ribbon 20 reach the pinch and feed rolls 24, the extruded members are desirably still in a heated state and at least the ribbon 20 is in a sufficiently plastic, fusible state to permit direct bonding together of the attachment flange 15 and the ribbon 20 by pressure applied by the rolls 24. More particularly, the bonding ribbon 20 is applied in a somewhat more fusible state, facilitated by having the nozzle 23 closer to the point of engagement of the ribbon 20 with the scrim margin 17 (see FIG. 5), so that as the squeeze roll pressure is applied, soft fusible material of the ribbon 20 will penetrate through the scrim openings 21, and fuse to the attachment margin 15 of the fastener strip. The strands of the scrim margin 17 are thus locked in the bonded assembly.

Enhanced locking engagement of the strands of the scrim margin 17 is provided for by preheating such margin, as for example by running it through a preheating tunnel 38 where the margin 17 is flanked by radiant heaters 39, and located along the path of the scrim from the roll 27 to guide 29. The plastic material of the bonding strip may thereby more intimately grip the preheated scrim strands.

In order to maintain the integrity of the ribs and grooves 18 and 19 of the fastener strip marginal track portion 11a, after leaving the extrusion nozzle 30 and before reaching the nip of the rolls 24 within an annular guide groove 40 in the upper of the rolls 24, the track portion 11a is desirably chilled to set the profile contours. Chilling may be effected by water spray or compressed air and water vapor directed toward the freshly extruded fastener track portion by means of an applicator 41 which may be supplied through a duct 42 under pressure from a suitable impulsion device 43 which may be a blower, pump, or the like. A shield 44 confines the chilling medium from the applicator 41 to the fastener track portion 11a and permits the attachment flange portion 15 to retain substantial residual extrusion heat to the bonding zone provided by and between the rolls 24, whereby bonding thereto of the bonding ribbon 20 is enhanced.

Although the direct extrusion and assembly of the fastener strip 11 and the bonding ribbon 20 with the scrim margin is the most direct mode of fabrication, the fastener strip 11 and the bonding ribbon 20 may be preformed and supplied from rolls to the scrim margin in the apparatus 23 and the attachment flange 15 and the bonding ribbon 20 reheated for effecting the bonding.

Downstream from the apparatus 23, the permanently bonded scrim and fastener assembly is adapted to be received from the table 25 and rolled up by reeling means (not shown) for future use, or it may go directly to apparatus for joining the assembly with the artificial turf components which may include the backing 13 and the nap 14 shown in FIG. 1.

From the foregoing it will be appreciated that among the advantages of the continuous interlocking rib and groove, non-toothed, zipper or continuous profiled extruded strip is that each separate but mating zipper allows freedom of movement from section to section of the artificial turf or covering, especially longitudinally of the zipper. This compensating capability adequately handles longitudinal movement in the form of expansion and contraction without distortion.

Another advantage of the continuous profiled extruded section is that ease of removal of each area or section of artificial turf or covering is achieved, permitting manually starting the disengagement of each half of the continuous profiled extruded section. Therefore, an "unzipping" slider is not required. In cases where a toothed zipper includes teeth which have been damaged engagement is difficult to achieve without removal of the misaligned or damaged teeth. In addition to this where a slider must be used for disengagement it can "foul" or catch on the damaged teeth. Such damaged teeth usually result in the complete removal of the zipper length, whereas in the case of a continuous profiled extruded section, this problem does not occur due to the flexibility of the continuous profiled extruded section.

A further advantage of the continuous profiled extruded section is that in the event of fouling of the profiles of the closure by dirt or other contaminant washing down and cleaning of the profiles is readily achieved. In the case of a toothed zipper misalignment of the fouled teeth often takes place with consequent failure of the zipper action.

It will be understood that variations and modifications may be effected without departing from the spirit and scope of the novel concepts of this invention.

I claim as my invention:

1. Means for anchoring large sheet material sections such as of the artificial turf type, or covers or the like, to other such sections or an anchoring device, comprising:
a mesh scrim which may be attached to or form part of backing along a margin of a material section, and carrying separable fastener means;
said fastener means comprising an extruded strip having an attachment flange along one edge and which flange is engaged with one face of a margin of said scrim for being generally aligned with said material section margin, and having resiliently flexible rib and groove fastener profile structure extending longitudinally along an opposite edge of said strip and adapted to be interlocked with complementary fastener profile structure;
thermoplastic bonding means engaged with an opposite face of said scrim margin and sandwiching said scrim margin between said attachment flange and said bonding means;
and said bonding means being bonded to said attachment flange through openings in said scrim margin and thereby assuring securement of said fastener means to said scrim.

2. Means according to claim 1, wherein said scrim margin has a substantially uniform pattern of mesh openings through which said bonding means is bonded to said attachment flange.

3. Means according to claim 1, wherein said bonding means comprises an extruded thermoplastic ribbon.

4. Means according to claim 1, wherein said fastener means strip has a resiliently yieldable longitudinal area between said attachment flange and said rib and groove fastener profile structure whereby to facilitate manipulation of said structure.

5. Means according to claim 4, wherein said area is of arched shape in cross-section.

6. Means according to claim 1, attached to the backing of carpeting.

7. A method of making a means for anchoring large material sections such as of the artificial turf type, or covers or the like, to other such sections or to an anchoring device, and comprising:
providing an extruded strip having along one edge an attachment flange and along an opposite edge a longitudinally extending rib and groove resiliently flexible fastener profile structure;
sandwiching a scrim margin between said attachment flange and a thermoplastic bonding means;
and thermoplastically bonding said bonding means to said attachment flange through openings in said scrim margin and thereby securing said fastener means to said scrim.

8. A method according to claim 7, which comprises providing said scrim margin with a uniform array of mesh openings through which said bonding means is bonded to said attachment flange.

9. A method according to claim 7, which comprises supplying said thermoplastic bonding means in the form of a ribbon aligned in back-to-back relation with said margin.

10. A method according to claim 7, which comprises providing said fastener means strip with a resiliently yieldable longitudinal area between said attachment flange and said fastener profile structure for facilitating manipulation of said structure.

11. A method according to claim 10, which comprises forming said intermediate area with an arched cross-section.

12. A method according to claim 7, which comprises attaching said scrim to a carpet backing.

13. Apparatus for making means for anchoring large material sections such as of the artificial turf type, or covers or the like, to other such sections or to an anchoring device, and comprising:
means for feeding scrim as a continuous strip along a fabrication path;

means for directing toward a margin of said scrim in movement along said path an extruded fastener strip provided with an attachment flange along one edge and longitudinally extending fastener rib and groove profile means along an opposite edge, said attachment flange being joined in face-to-face engagement with one face of a margin of the scrim as the scrim moves along said fabrication path;

means for directing a thermoplastic bonding means toward and into engagement with the opposite face of said scrim margin and in the direction of movement of said scrim and said fastener strip in said fabrication path;

and means for effecting bonding of said bonding means to said scrim margin through openings in said scrim margin and thereby securing said scrim margin in sandwiched relation between said attachment flange and said bonding means.

14. Apparatus according to claim 13, which comprises means for supplying said scrim from a roll of open mesh scrim material.

15. Apparatus according to claim 13, wherein said feeding means is adapted to guide said scrim strip across a free span toward said means for effecting bonding, and said means for directing said extruded fastener strip comprises an extruder having an extrusion nozzle located at one side of said free span, and said means for directing said bonding means comprising an extruder having an extrusion nozzle at the opposite side of said free span.

16. Apparatus according to claim 15, wherein said means for effecting bonding comprises rotary pressure rollers between which said scrim margin attachment flange and bonding means is caused to travel in said fabrication path, and both of said extrusion nozzles being directed to extrude generally toward the infeed side of a pressure and feed nip of said rolls.

17. Apparatus according to claim 16, wherein said nozzle for extrusion of said bonding means is located closer to said nip than the other of said nozzles.

18. Apparatus according to claim 13, comprising means for extruding said fastener strip toward said scrim margin in said fabrication path, means for chilling said fastener rib and groove profile means of the fastener strip after leaving the extruding means and before reaching said scrim margin, and means for shielding said attachment flange from said chilling means.

19. Apparatus according to claim 13, wherein said means for directing a thermoplastic bonding means comprises an extruder having a nozzle for directing said bonding means in the form of a thermoplastic ribbon toward said scrim margin.

20. Apparatus according to claim 13, which includes means for preheating said scrim margin before engagement thereof by said attachment flange and said bonding means.

* * * * *